Patented Nov. 5, 1935

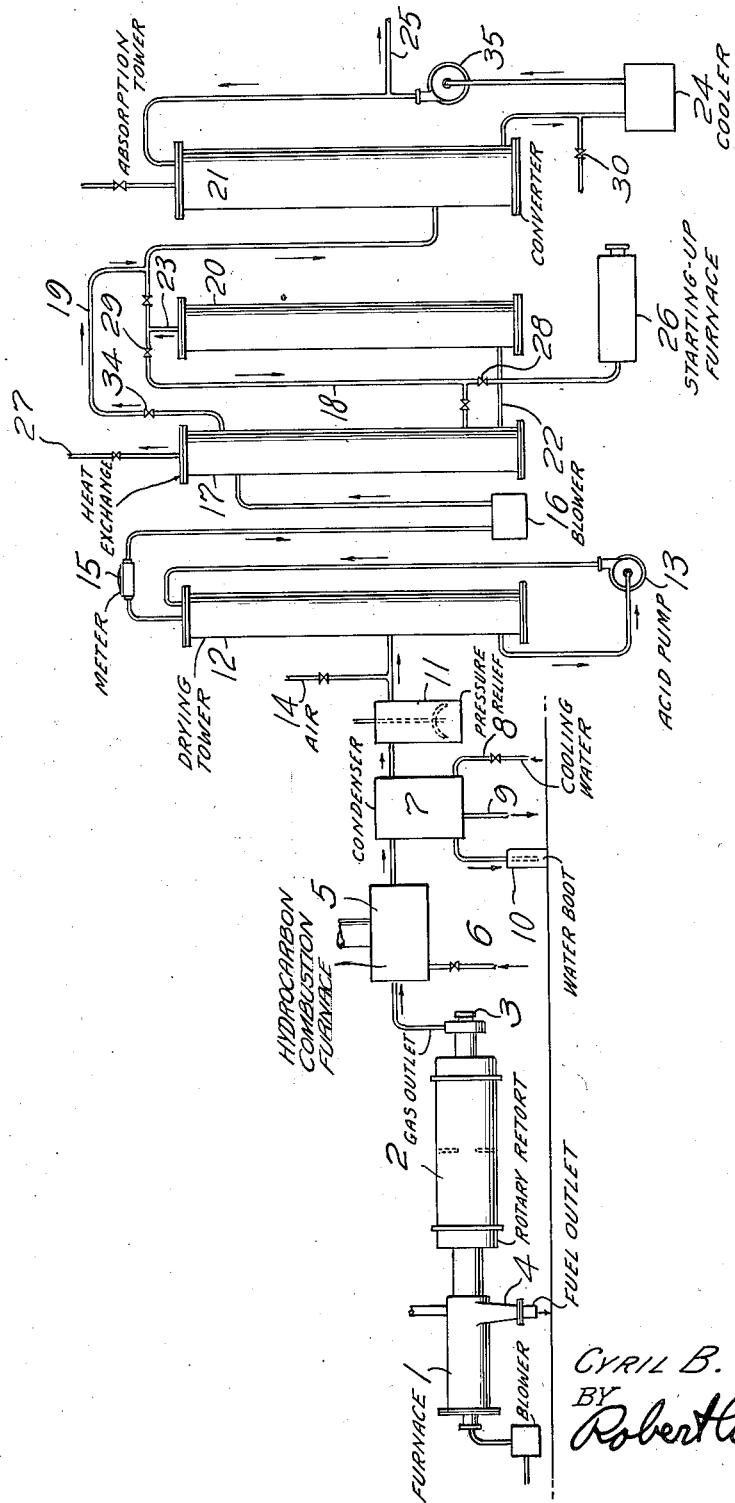

2,019,893

UNITED STATES PATENT OFFICE 2,019,893

PRODUCTION OF SULPHURIC ACID BY THE CONTACT PROCESS

Cyril B. Clark, Scarsdale, N. Y., assignor to American Cyanamid Company, New York, N. Y., a corporation of Maine Application May 9, 1933, Serial No. 670,123

2 Claims. (Cl. 23—175)

This invention relates to the production of contact sulphuric acid from the sulphuric acid residues obtained in the purification of carbonaceous material and more particularly from the acid sludge obtained from the purification of petroleum and petroleum fractions with sulphuric acid.

The refining of petroleum products and similar carbonaceous substances generally requires the step of treating these substances with concentrated sulphuric acid. In this operation an acid sludge residue is obtained which has hitherto been of practically no value and has resulted in serious problems in regard to its safe disposal. Attempts have been made to dispose of this sludge by burning it but such a procedure is generally unsatisfactory due to the sticky, acid, odorous character of the material which makes it difficult to handle, the corrosive action of the acid compounds on the burner equipment and the steam boiler when it is used as a fuel for producing power, and due to the large volume of gases evolved containing oxides of sulphur and which may cause a nuisance in thickly populated communities and even in isolated locations may damage vegetation. Due to its obnoxious properties it cannot be dumped into streams. The usual practice has, therefore, been to transport it to some out of the way spot and deposit it in some depression far from localities where it can do harm. Therefore the disposal of acid sludge has presented a serious problem to oil refineries.

Several processes have been proposed in the past for utilizing acid sludges. These processes in general consist in decomposing the acid sludge by means of heat with concomitant reduction of a greater or lesser proportion of the $SO_4$ compounds by the carbonaceous material to form a gas containing sulphur dioxide and the utilization of this sulphur dioxide gas for producing sulphuric acid. As the demand in oil refineries is usually for strong acid, the contact sulphuric acid process, which produces this grade of acid, is particularly applicable from the oil refiner's standpoint. Until recently, none of the processes proposed have proven commercially successful.

The process described by Hechenbleikner, in U. S. Serial No. 568,050, filed October 10, 1931, now Patent 1,953,225 is the first to achieve notable commercial success. In this process the acid sludge is heated in rotary kilns by direct contact with hot combustion gases which may be produced either from carbonaceous material or if desired, from brimstone or sulphur bearing materials. It has also been recently proposed to thermally decompose certain types of acid sludge in externally fired retorts with violent agitation, while keeping the sludge liquid by diluting with petroleum fractions.

When acid sludge is thermally decomposed a gas is obtained containing sulphur dioxide, some hydrocarbons or hydrogen containing materials and in some cases, nitrogen, carbon dioxide, etc., together with a considerable amount of water vapor. In commercial practice, the water vapor is removed by cooling the gases in a condenser and then treating them with strong sulphuric acid in a drying tower. This operation also removes a large part of the hydrocarbons but unless conducted with the greatest care and with large and expensive equipment, the removal will not be complete and some of the more difficultly condensable hydrocarbons will remain in the gas. In order to supply sufficient oxygen to convert the sulphur dioxide to sulphur trioxide, air is generally mixed with the gas before it enters the drying tower and the mixture then passes along to the converter in the contact sulphuric acid plant. When the hydrocarbons or other hydrogen containing material in the gas reach the converter they are oxidized and the hydrogen contained therein forms water. The present invention relates, particularly to the control of the amount of water so formed and the modifications in the contact sulphuric acid process made necessary by the presence of these hydrocarbons.

The water formed in the converter does no particular harm to the catalyst as the temperature is so high that it does not react with the sulphur trioxide formed. However, if the amount of water exceeds about 30 mg. per cu. ft., serious trouble is encountered after the gases leave the converter. The gases are cooled before they pass to an absorption tower in which the sulphur trioxide is absorbed in strong acid and converted to sulphuric acid by combination with water. If water is present and the gases are cooled below the dew point, sulphuric acid mist may be formed and seriously corrode and destroy the cooling equipment and the gas flues. The mist so formed, however, is very difficult to condense and a large part of it will pass directly through the absorber, will corrode the stack and be lost. Even when the gases are caused to enter the absorber at temperatures above the dew point, sulphuric acid mist will form when the gases come in contact with the relatively cold absorbing acid. The sulphuric acid mist thus formed by either step constitutes a loss in yield in the process, and, moreover, may cause a serious nuisance in the surrounding neighborhood if discharged into the atmosphere in large amounts.

The prior art discloses no method of handling this acid mist problem raised by the presence of hydrocarbons in the $SO_2$ gas. This is probably due to the fact that no successful commercial processes for producing $SO_2$ from acid sludge were worked out until the recent Hechenbleikner process referred to above was put into operation. In the Hechenbleikner process, it is suggested that the hydrocarbon compounds be completely removed. This procedure, is, of course, effective in preventing formation of acid mist but it presents certain difficulties in practical operation, particularly, when using acid sludge containing a high oil content, as it is almost impossible to reliably and continuously remove all hydrogen containing material from the gas stream without such elaborate equipment as to render the process unnecessarily expensive.

In accordance with the present invention, the problem of acid mist is solved in a simple manner without the use of expensive equipment. I have found that it is not necessary to completely remove hydrocarbons and similar hydrogen containing gases prior to their introduction into the converters. The free water in the gases is very efficiently removed by a condenser and drying tower system, to a point where the water content is 2 mg. per cu. ft., or less and no trouble is experienced due to the formation of acid mist unless the water content exceeds a certain minimum which I have found in practical operation to be from 25 to 30 mg. per cu. ft. If, therefore, hydrocarbons or other hydrogen containing gases are only partially removed, so that the amount of hydrogen remaining does not substantially exceed 2½ to 3 mg., so that the amount of water formed by burning these hydrocarbons in the converter will not exceed from 23 to 28 mg. per cu. ft., no difficulty is encountered.

The reduction of the hydrocarbon content of the gases to the desired point can be accomplished in various ways. It may be effected for example, by a simple form of pre-combustion furnace introduced into the train of equipment between the acid sludge still and the converter. In this case the air which is ordinarily added to provide the necessary oxygen for carrying out the contact sulphuric acid reaction can be introduced into the combustion furnace. Other methods such as the refrigeration of the gases to condense difficultly condensable constituents and particularly scrubbing with solvents in which the hydrocarbon gases are soluble are also effective. None of these methods, however, will result in complete removal of all the hydrocarbon gases, as has been suggested in the past by Hechenbleikner, unless practiced with extraordinary care and with elaborate equipment. It is an advantage of the present invention that contrary to what was thought necessary in the past, a portion of the hydrocarbon gases may remain in the gases passing to the converters and not cause any harm, provided their amounts are kept below the critical point. It is, therefore possible to operate without elaborate equipment and yet be completely free from the serious menace of acid mist formation.

When partial combustion is to be employed in order to lower the hydrocarbon content of the gas stream, the pre-combustion furnace may be situated between the acid sludge still and the water condenser. This will result in the combustion of most of the hydrocarbons both condensable and non-condensable. Where the amount of condensable hydrocarbons is comparatively small as in many installations using the Hechenbleikner process, on typical low oil sludges, this does not cause any serious problem and the full effect of water removal achieved by using the condenser and drying tower in series is retained. With some sludges and under certain conditions of operation, however, a large quantity of condensable hydrocarbons are present in the gas stream and in such cases it may be desirable to pass the gas stream first through the condenser to remove a considerable portion of the water and all of the condensable hydrocarbons. When the pre-combustion furnace is placed after the condenser, it throws a somewhat higher water load on the drying tower. This may make it desirable to insert a second condenser between the furnace and the drying tower or if the drying tower acid absorbs more moisture than is needed to take care of the $SO_3$ formed in the whole system some of the drying tower acid may be sent back into the acid sludge still and redistilled in accordance with the application of Hechenbleikner, Serial No. 574,244, filed November 11, 1931. If the gas conditions are such that drying tower acid is to be re-circulated in any event, the second condenser may be dispensed with, a cooler substituted and the amount of drying tower acid recirculated slightly increased.

In general, the present invention is not concerned with a particular placement or arrangement of hydrocarbon removing equipment and includes any suitable equipment or method which will reduce the condensable hydrocarbon content of the gases to the point where they do not exceed the upper limit herein specified as required to prevent the formation of acid mist. No claim is made in the present application to the particular arrangement of hydrocarbon removal per se apart from its use in the process of the present invention. The invention is also in no sense limited to any particular type of equipment used for the production of sulphur dioxide containing gases from acid sludge, although it is particularly applicable and operates effectively with the equipment described in the Hechenbleikner process.

In its broader aspects, therefore, the invention is not concerned with the particular design of acid sludge decomposing retorts or kilns nor with the particular design or placement of hydrocarbon removing equipment. In its more specific aspects, however, the combination of the partial removal of non-condensable hydrocarbons or hydrogen containing gases with the Hechenbleikner system of acid sludge decomposition, constitutes a preferred embodiment and is claimed as a specific modification of the invention.

Similarly, the invention is not concerned with a particular type of combustion gas used for effecting acid sludge decomposition in a Hechenbleikner system and is equally applicable to the two main modifications of this system, namely, the one using combustion gases from carbonaceous material and the one using combustion gases from sulphur containing material. Obviously, of course, when sulphur containing gases are used, the amount of surphur dioxide per unit volume of gases leaving the acid sludge kiln is very much greater, consequently the volume of added air which is necessary before the gas passes into the converter is similarly increased. This results in a much larger dilution of the gases, and, accordingly, a much less thorough removal of hydrocarbons is necessary.

The invention will be described in more detail in conjunction with a typical Hechenbleikner acid cludge decomposing system, it being understood, of course, that this system which is shown in the drawing, is a typical illustration only, and the invention is not limited to the details therein set forth.

The above general discussion of the invention has been based primarily on continuous processes of acid sludge decomposition, of which the Hechenbleikner process is a typical illustration. While the invention can be used with particular effect in conjunction with continuous processes where the evolution of hydrocarbon gases is more or less regular the invention is in no sense limited to continuous processes and is equally applicable to batch processes in which acid sludge is thermally decomposed in batches. Such processes require a somewhat closer adjustment as the rate at which hydrocarbon gases are given off is not as uniform as in a continuous process.

The following description refers to the attached drawing and discloses one way in which my invention may be carried out.

Air and fuel enter the combustion furnace 1 in regulated amounts, the fuel and the necessary air being pumped into the furnace under a slight pressure. The combustion gases from furnace 1 enter a rotary retort 2 which is provided with suitable agitating means. The acid sludge is caused to travel counter-current to the combustion gases. The sludge enters the rotary retort at 3 and while passing through the retort is subjected to increasing temperatures in contact with the combustion gases, three main temperature zones being provided, first, a temperature high enough to distill off water and light hydrocarbons, second, a temperature at which most of the $SO_4$ compounds are reduced to sulphur dioxide and, third, a still higher temperature at which the sludge is transformed to a granular stable fuel. In the drawing the sludge is introduced continuously through a hollow trunion at 3, and the fuel is discharged through a discharge valve 4. It should be noted that the temperature of the different zones can be easily regulated and the reactions modified by varying the amount of acid sludge charged, the volume and/or temperature of the gases entering the rotary retort and speed of rotation of the retort.

The sulphur dioxide containing gases generated in the retort pass through a pipe into the combustion furnace 5 and here most of the hydrocarbons are burned. Air and, if necessary, additional fuel are supplied to the furnace 5, in order to give the necessary oxygen and the necessary temperature to oxidize the hydrocarbons.

The gases from the combustion furnace pass through the condenser 7, which is cooled by water introduced through the pipe 8, and leaving through pipe 9. The condensed water is continuously removed through the water boot or seal 10. The partially dehydrated gases then pass through a pressure relief valve 11 into a drying tower 12, where drying acid is continuously circulated by means of the acid pump 13. If required, additional air may be introduced through the valved pipe 14. The gases next pass up through the drying tower 12 and are dehydrated to the point where they contain approximately 2 mg. of water per cu. ft. They then pass through the meter 15 to the blower 16.

The dry gases at the blower are at approximately room temperature due to the cooling in the condenser 7 and the drying tower 12. These gases must be heated in order to bring them up to the temperature necessary for the catalytic oxidation of sulphur dioxide to sulphur trioxide. Therefore, the gases are passed through heat exchanger 17 where their temperature is raised by heat interchange with a portion of the gases which have passed through the converter and which are at a high temperature due to the heat generated by the reaction. The hot gases from the converter pass through the valved pipe 18 into the heat exchanger 17 and thence through the pipe 19 into the line leading from the converter 20 to the absorption tower 21. The gases after being preheated in the heat exchanger enter the converter through the pipe 22 and leave by the T 23.

Strong sulphuric acid is circulated over the absorbing tower 21 by means of the pump 35 through the cooler 24, the excess acid produced being taken off through the pipe 25 while weak acid is introduced through the valved pipe 30 to maintain the strength of the absorbing acid at the proper point. The residual gases substantially free from sulphur trioxide and sulphuric acid mist pass out of the stack 26 to the atmosphere.

Since the gases leaving the blower 16 are at a low temperature it is impossible to start up the converter when the plant is to be brought into operation without auxiliary heat, because the temperature is insufficient to permit the catalytic oxidation of sulphur dioxide to commence. Therefore, a starting furnace 26 is provided which can be used to send hot combustion gases through the heat exchanger 17 and to the atmosphere through valved pipe 27. As soon as the gases in the heat exchanger have reached the necessary temperature, so that conversion starts in the converter, the valves 27 and 28 are closed and the valves 29 and 34 are opened and thereafter a portion of the gases leaving the converter serve to preheat the gases in the heat exchanger 17.

The drawing shows the various pieces of equipment in purely diagrammatical form. Since the present invention is not concerned with details of mechanical construction the drawing is really more in the nature of a flow sheet. It should be understood, of course, that various modifications in equipment and arrangement may be necessary to meet the particular conditions in different plants, and, of course, are included in the invention.

I claim:

1. A method of producing sulphur trioxide which comprises subjecting an acid sludge from the sulphuric acid treatment of hydro-carbonaceous material to thermal decomposition at a temperature at which $SO_4$ compounds of the sludge are reduced to $SO_2$, removing the $SO_2$ from the zone of decomposition together with water vapor and gaseous substances containing hydrogen, subjecting the said gas stream to dehydration, incompletely removing substances containing hydrogen capable of reacting with oxygen to form water to an extent such that the remaining hydrogen content, after adjustment of the gas stream to the oxygen content necessary for catalytically oxidizing the $SO_2$ is not greater than 3 mg. of hydrogen per cu. ft. of gas, heating the gas stream to a temperature at which it can be catalytically oxidized and subjecting it at this temperature to the action of a sulphuric acid catalyst in a converter, whereby the $SO_2$ is catalytically oxidized to $SO_3$.

2. A method of producing sulfur trioxide which comprises subjecting an acid sludge from the sulfuric acid treatment of hydrocarbonaceous material to thermal decomposition at a temperature at which $SO_4$ compounds of the sludge are reduced to $SO_2$, removing the $SO_2$ from the zone of decomposition together with water vapor and gaseous substances containing hydrogen, subjecting the said gas stream to dehydration, incompletely removing substances containing hydrogen capable of reacting with oxygen to form water to an extent such that the remaining hydrogen content, after adjustment of the gas stream to the oxygen content necessary for catalytically oxidizing the $SO_2$ is between 0.11 and 3 mg. of hdyrogen per cu. ft. of gas, heating the gas stream to a temperature at which it can be catalytically oxidized and subjecting it at this temperature to the action of a sulfuric acid catalyst in a converter, whereby the $SO_2$ is catalytically oxidized to $SO_3$.

CYRIL B. CLARK.